Feb. 14, 1928.
F. W. MAGEE
1,659,324
EYESHIELD FOR MOTORISTS
Filed May 27, 1926
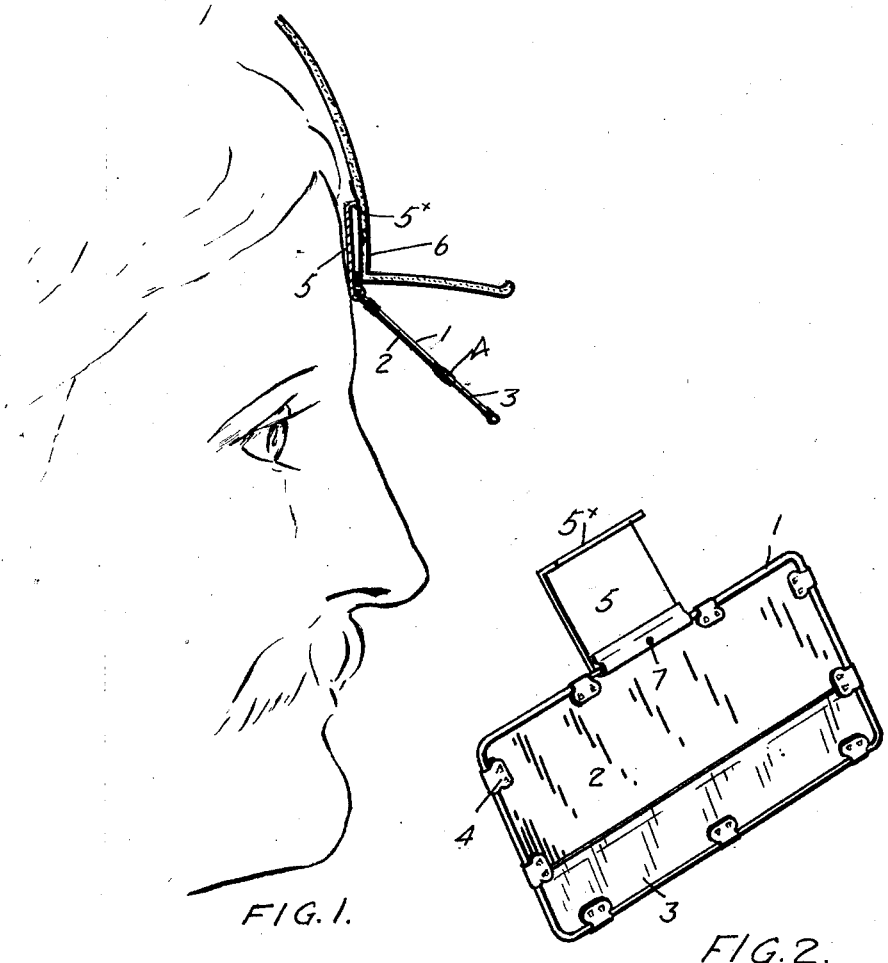
FIG. 1.
FIG. 2.
FIG. 3.
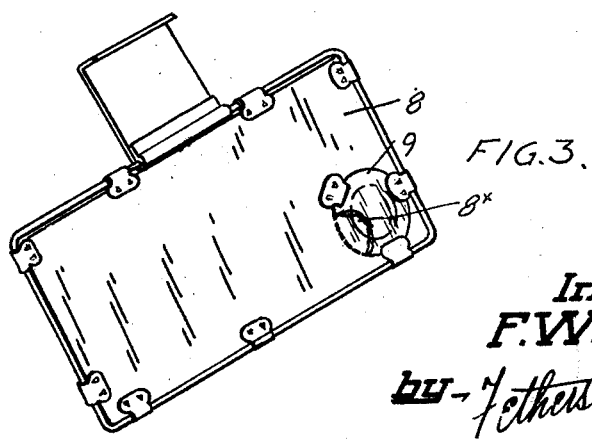

Patented Feb. 14, 1928.

1,659,324

UNITED STATES PATENT OFFICE.

FREDERICK WILLIAM MAGEE, OF LONDON, ONTARIO, CANADA, ASSIGNOR OF ONE-HALF TO THOMAS WILLIAM BAKER, OF LONDON, ONTARIO, CANADA.

EYE SHIELD FOR MOTORISTS.

Application filed May 27, 1926. Serial No. 112,142.

My invention relates to improvements in eye shields for motorists, and the object of the invention is to devise a shield which will fully protect the eyes of the driver from glare such as is produced by the rays of the headlights of an oncoming car, or of the sun when at a low altitude and yet will permit him to have a clear vision of such car as it approaches, or any other object in his line of vision and consequently eliminate any possibility of accident from this cause, and it consists essentially of the arrangement and construction of parts as hereinafter more particularly explained.

Fig. 1 is a sectional view of my device showing its application.

Fig. 2 is a perspective detail of my device.

Fig. 3 is a modified form of my device.

In the drawing like characters of reference indicate corresponding parts in each figure.

1 indicates a frame which is preferably rectangular in form and of wire construction in which is secured the shield proper comprising an opaque sheet 2 forming the upper portion of the shield and a transparent sheet 3 forming the lower portion of the shield. The portions 2 and 3 preferably overlap and are secured within the frame 1 by means of clips 4 which may be of the ordinary paper clip type.

5 is a plate which is swung upon the upper bar of the frame 1 centrally of its length as indicated, the plate being provided with a sleeve like portion through which such bar extends. The upper edge of the bar is turned outward as indicated at 5ˣ.

When in use the plate 5 is slipped between the hat 6 and the forehead of the wearer as illustrated in Figure 1. As the space between the hat and the head of the wearer increases upward there is plenty of room for the outturned portion 5, the edge of which is forced against the hat so as to have a biting grip preventing any possible danger of the shield slipping out of place.

The shield is then adjusted to the proper angular position so that the user can just have direct forward vision beneath the lower edge of the shield. The transparent portion permits of the driver's vision being extended upward into the glare of a light ahead of him without being dazzled thereby. The upper portion of the shield above the vision of the driver is opaque so as to fully shield the eyes from downward directed rays and the surface of such portion may be also used for advertising medium when desired.

A set screw 7 may be used to firmly hold the shield at the required angle when adjusted thereto.

In Figure 3 I have shown a modified construction in which the major portion 8 of the shield is made opaque with relatively small opening 8ˣ in one corner thereof which is covered by a transparent piece 9 held in place by suitable clips or other means so that when necessary the driver may glance with one eye through this opening or window to extend his field of vision as desired.

What I claim as my invention is:

The combination with a head surrounding member, of a motorist's eye shield comprising a shield body, a plate hingedly connected to the upper edge of the body and independent of the head surrounding member, and an outturned portion at the upper or free edge of the plate adapted when the plate is inserted between the head surrounding member and the head to have a biting grip at its edge against such head surrounding member due to pressure against the plate of the head when inserted within such head surrounding member.

FREDERICK WILLIAM MAGEE.